United States Patent
Nammi

(10) Patent No.: US 10,608,697 B2
(45) Date of Patent: Mar. 31, 2020

(54) FACILITATING IMPROVEMENTS TO THE UPLINK PERFORMANCE OF 5G OR OTHER NEXT GENERATION NETWORKS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 13 days.

(21) Appl. No.: 15/870,623

(22) Filed: Jan. 12, 2018

(65) Prior Publication Data
US 2019/0222256 A1 Jul. 18, 2019

(51) Int. Cl.
*H04B 1/7143* (2011.01)
*H04L 25/02* (2006.01)
(Continued)

(52) U.S. Cl.
CPC .......... *H04B 1/7143* (2013.01); *H04B 1/713* (2013.01); *H04B 1/7156* (2013.01); *H04L 5/006* (2013.01); *H04L 5/0012* (2013.01); *H04L 5/0085* (2013.01); *H04L 5/0091* (2013.01); *H04L 25/0222* (2013.01); *H04L 25/0224* (2013.01); *H04W 72/1289* (2013.01); *H04L 5/0023* (2013.01); *H04L 5/0051* (2013.01); *H04L 27/26* (2013.01)

(58) Field of Classification Search
None
See application file for complete search history.

(56) References Cited

U.S. PATENT DOCUMENTS

| | | |
|---|---|---|
| 5,425,049 A | 6/1995 | Dent |
| 5,875,184 A | 2/1999 | Altvater et al. |

(Continued)

FOREIGN PATENT DOCUMENTS

| | | |
|---|---|---|
| EP | 1130858 B1 | 6/2006 |
| WO | 2016183739 A1 | 11/2016 |
| WO | 2016186456 A1 | 11/2016 |

OTHER PUBLICATIONS

Geirhofer et al., "Cognitive Frequency Hopping Based on Interference Prediction: Theory and Experimental Results," ACM SIGMOBILE Mobile Computing and Communications Review, 2009, pp. 49-61, vol. 13, No. 2, 13 pages.

(Continued)

*Primary Examiner* — Mohammad S Adhami
(74) *Attorney, Agent, or Firm* — Amin, Turocy & Watson, LLP

(57) ABSTRACT

Facilitating improvements to the uplink performance in a communications network is provided herein. A system can comprise a processor and a memory that stores executable instructions that, when executed by the processor, facilitate performance of operations. The operations can comprise comparing respective metrics of a group of frequency hopping patterns based on a channel response received from a mobile device via uplink reference signals. The operations can also comprise selecting a frequency hopping pattern from the group of frequency hopping patterns based on a result of the comparing. Further, the operations can comprise indicating, to the mobile device, an index of the frequency hopping pattern with scheduling information of a communications network.

20 Claims, 14 Drawing Sheets

(51) Int. Cl.
*H04L 5/00* (2006.01)
*H04B 1/713* (2011.01)
*H04W 72/12* (2009.01)
*H04B 1/7156* (2011.01)
*H04L 27/26* (2006.01)

(56) References Cited

U.S. PATENT DOCUMENTS

| | | |
|---|---|---|
| 6,256,334 B1 | 7/2001 | Adachi |
| 6,501,785 B1 | 12/2002 | Chang et al. |
| 6,647,053 B1 | 11/2003 | Garces |
| 7,733,938 B2 | 6/2010 | Yang et al. |
| 8,340,157 B2 | 12/2012 | Arvidsson et al. |
| 8,363,693 B2 | 1/2013 | Fujiwara |
| 8,428,101 B1 | 4/2013 | Sarca et al. |
| 8,478,283 B2 | 7/2013 | Periyalwar et al. |
| 8,761,784 B2 | 6/2014 | Malladi et al. |
| 9,136,902 B2 | 9/2015 | Chang et al. |
| 9,271,298 B1 | 2/2016 | Talley et al. |
| 9,294,145 B2 | 3/2016 | Azizi et al. |
| 9,717,094 B2 | 7/2017 | Novlan et al. |
| 9,819,387 B2 | 11/2017 | Kwon et al. |
| 9,839,068 B2 | 12/2017 | Yu |
| 2005/0159106 A1 | 7/2005 | Palin et al. |
| 2005/0176371 A1 | 8/2005 | Palin et al. |
| 2006/0013285 A1 | 1/2006 | Kobayashi et al. |
| 2006/0285579 A1* | 12/2006 | Rhee .................. H04B 1/7156 375/132 |
| 2008/0101319 A1 | 5/2008 | Rao |
| 2008/0285490 A1 | 11/2008 | Mukai et al. |
| 2009/0247229 A1* | 10/2009 | Teo .................. H04B 7/0691 455/562.1 |
| 2012/0300740 A1 | 11/2012 | Iwai et al. |
| 2012/0307869 A1 | 12/2012 | Charbit et al. |
| 2013/0201941 A1 | 8/2013 | Classon et al. |
| 2013/0301452 A1 | 11/2013 | Yoon |
| 2017/0111916 A1* | 4/2017 | Corroy ............. H04W 72/0426 |
| 2017/0208591 A1 | 7/2017 | Rico Alvarino et al. |
| 2017/0373715 A1* | 12/2017 | Moroga ................ H04B 1/713 |
| 2018/0295651 A1* | 10/2018 | Cao ...................... H04W 76/27 |

OTHER PUBLICATIONS

Yang et al., "Information-Guided Channel-Hopping for High Data Rate Wireless Communication," IEEE Communications Letters, Apr. 2008, pp. 225-227, vol. 12, No. 4, 4 pages.

International Search Report and Written Opinion received for PCT Application Serial No. PCT/US2018/065790 dated Jul. 15, 2019, 33 pages.

Deng et al., "Effect of Intra-subframe Frequency Hopping on Closed-Loop Type Transmit Diversity with Precoding for Uplink DFT-Precoded OFDMA", IEEE Vehicular Technology Conference (VTC Fall), 2011, 5 pages.

* cited by examiner

FACILITATING IMPROVEMENTS TO THE UPLINK PERFORMANCE OF 5G OR OTHER NEXT GENERATION NETWORKS

TECHNICAL FIELD

The subject disclosure relates generally to communications systems, and for example, to facilitating improvements to the uplink performance of 5G or other next generation networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
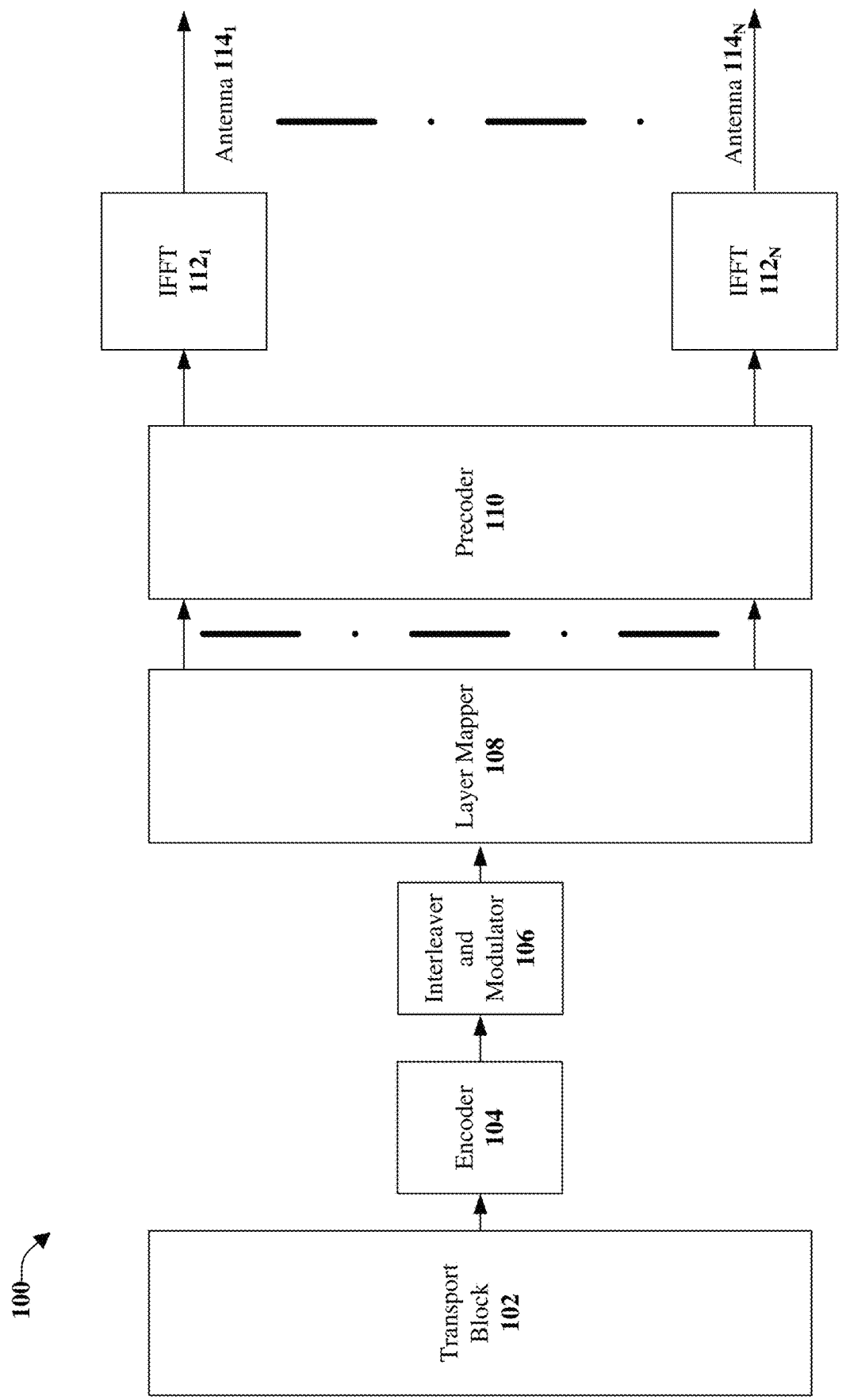
FIG. 1 illustrates an example, non-limiting, block diagram of an uplink multiple input multiple output transmitter in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to facilitating improvements to the uplink performance for 5G or other next generation networks. For example, as discussed herein a Multiple Input Multiple Output (MIMO) performance can be improved for all scenarios. In another example, the disclosed aspects can increase network capacity due to improved mobile device (e.g., user equipment) performance for all scenarios.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for facilitating improvements to the uplink performance for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

In one embodiment, described herein is a system that can comprise a processor and a memory that stores executable instructions that, when executed by the processor, facilitate performance of operations. The operations can comprise comparing respective metrics of a group of frequency hopping patterns based on a channel response received from a mobile device via uplink reference signals. The operations can also comprise selecting a frequency hopping pattern from the group of frequency hopping patterns based on a result of the comparing. Further, the operations can comprise indicating, to the mobile device, an index of the frequency hopping pattern with scheduling information of a communications network.

In an example, indicating the index of the frequency hopping pattern selected can comprise transmitting the index to the mobile device via an uplink grant channel In another example, indicating the index of the frequency hopping pattern selected can comprise sending the index to the mobile device via radio resource control signaling. In a further example, indicating the index can comprise indicating the index during respective transmission time intervals of a data transmission. According to an aspect, selecting the frequency hopping pattern can comprise selecting a pattern that comprises no frequency hopping.

In an example, the uplink reference signals can occupy defined resource elements within an uplink time frequency grid. Further to this example, comparing the respective metrics can comprise estimating the respective metrics based on a signal to noise ratio over the defined resource elements.

In accordance with an aspect, the operations can further comprise configuring the mobile device with the group of frequency hopping patterns using radio resource control signaling.

According to another aspect, comparing the respective metrics comprises determining a Doppler metric of the mobile device. Further to this aspect, selecting the frequency hopping pattern comprises, based on a first determination that the Doppler metric satisfies a defined threshold, the operations can comprise selecting a first frequency hopping pattern of the group of frequency hopping patterns that increases a diversity gain of the communications network relative to a current diversity gain. Further, selecting the frequency hopping pattern comprises, based on a second determination that the Doppler metric does not satisfy the defined threshold, the operations can comprise selecting a second frequency hopping pattern of the group of frequency hopping patterns that increases channel capacity information relative to current channel capacity information. In addition, selecting the second frequency hopping pattern can comprise selecting the second frequency hopping pattern based on a determination that the second frequency hopping pattern comprises a maximum frequency difference between a highest frequency and a lowest frequency in comparison to other frequency hopping patterns in the set of frequency hopping patterns.

In some aspects, indicating the index of the frequency hopping pattern selected with the scheduling information can comprise indicating via a downlink control channel configured to operate according to a fifth-generation wireless communication network protocol.

Another embodiment described herein is a method that can comprise selecting, by a network device of a wireless network, a frequency hopping pattern from a group of frequency hopping patterns based on a comparison of respective metrics of the group of frequency hopping patterns as a function of a channel response received from a mobile device via uplink reference signals. The method can also comprise facilitating, by the network device, transmission of a first indication of an index of the frequency hopping pattern selected from the group of frequency hopping patterns and a second indication of scheduling information. The frequency hopping pattern and the scheduling information can be selected to increase a data carrying capacity of the wireless network.

According to an example, facilitating the transmission can comprise facilitating the transmission via a downlink control information channel According to another example, facilitating the transmission can comprise facilitating the transmission via radio resource control signaling.

In an aspect, selecting the frequency hopping pattern can be performed during different transmission time intervals. Further to this aspect, facilitating the transmission can comprise facilitating the transmission based on a change to the frequency hopping pattern selected between the different transmission time intervals.

Prior to the selecting the frequency hopping pattern, the method can comprise configuring, by the network device, the mobile device with information related to the group of frequency hopping patterns.

In an aspect, the method can comprise determining a Doppler metric of the mobile device. Further to this aspect, selecting the frequency hopping pattern comprises, based on a first determination that the Doppler metric does satisfy a defined threshold, the method can comprise selecting a first frequency hopping pattern of the group of frequency hopping patterns that results in a reduction of power utilized by the mobile device. Selecting the frequency hopping pattern can also comprise, based on a second determination that the Doppler metric does not satisfy the defined threshold, the method can comprise selecting a second frequency hopping pattern of the group of frequency hopping patterns that results in a highest channel capacity increase of channel capacity increases of the group of frequency hopping patterns.

In an example, selecting the second frequency hopping pattern can comprise selecting the frequency hopping pattern based on a determination that the frequency hopping pattern comprises a maximum frequency difference between a highest frequency and a lowest frequency as compared to other frequency hopping patterns in the set of frequency hopping patterns.

Another embodiment relates to a machine-readable storage medium, comprising executable instructions that, when executed by a processor, facilitate performance of operations. The operations can comprise configuring a mobile device with respective indices of frequency hopping patterns. Based on a comparison of respective metrics of the frequency hopping patterns and based on a channel response received from the mobile device via uplink reference signals, the operations can comprise selecting a frequency hopping pattern from the frequency hopping patterns for a first transmission time interval. The operations can also comprise indicating, to the mobile device during the first transmission time interval, the frequency hopping pattern.

In an aspect, the frequency hopping pattern can be a first frequency hopping pattern, the comparison can be a first comparison, the channel response can be a first channel response. Further to this aspect, the operations further comprise based on a second comparison of the respective metrics of the frequency hopping patterns of the frequency hopping patterns and based on a second channel response received from the mobile device via the uplink reference signals, selecting a second frequency hopping pattern from the frequency hopping patterns for a second transmission time interval. The operations can also comprise indicating, to the mobile device during the second transmission time interval, the second frequency hopping pattern.

According to another aspect, the operations can further comprise determining a Doppler metric of the mobile device. Based on a first determination that the Doppler metric does satisfy a defined threshold, the operations can comprise selecting a first frequency hopping pattern from the frequency hopping patterns that maximizes a diversity gain of a communications network. Based on a second determination that the Doppler metric does not satisfy the defined threshold, the operations can comprise selecting a second frequency hopping pattern from the frequency hopping patterns that maximizes capacity information and mutual information of a channel.

Another embodiment relates to a method that can comprise receiving, at a mobile device comprising a processor, and from a network device, a recommended frequency hopping pattern. The method can also comprise determining, by the mobile device, a transmission scheme based on the recommended frequency hopping pattern. Further, the method can comprise applying, by the mobile device, the recommended transmission scheme for an uplink data transmission. In some implementations, the transmission scheme can be determined based on a hopping index and scheduling information received at the mobile device with the recommended frequency hopping pattern.

In an example, the recommended frequency hopping pattern can be based, in part, on a Doppler metric of the mobile device. Further to this example, the method can comprise receiving, at the mobile device, a first recommendation of a first frequency hopping pattern from a group of frequency hopping patterns based on the Doppler metric satisfying a defined threshold. The first frequency hopping pattern can maximize a diversity gain of a communications network. The method can also comprise receiving, at the mobile device, a second recommendation of a second frequency hopping pattern from a group of frequency hopping patterns based on the Doppler metric not satisfying the defined threshold. The second frequency hopping pattern can maximize capacity information and mutual information of a channel.

In further detail, MIMO technology is an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) are special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, represents how much the transmission power can be reduced when the diversity scheme is introduced, without a corresponding performance loss. MIMO can also be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, massive MIMO systems are currently under investigation for 5G systems.

FIG. 1 illustrates an example, non-limiting, block diagram of an uplink MIMO transmitter 100 in accordance with one or more embodiments described herein. FIG. 1 illustrates the uplink multi-antenna transmission in 5G systems with up to four antenna ports. However, another number of antenna ports can be utilized with the disclosed aspects. Illustrated are a transport block 102, an encoder 104, an interleaver and modulator 106, a layer mapper 108, a precoder 110, Inverse fast Fourier transform blocks $112_1$ through $112_N$, and transmit antennas $114_1$ through $114_N$, where N is an integer.

Antenna or the layer mapping can be described as a mapping from the output of the data modulation to the different antenna ports. Thus, the input to the antenna mapping can comprise the modulation symbols (e.g., Quadrature Phase Shift Keying (QPSK), 16 QAM (Quadrature Amplitude Modulation), 64 QAM, and/or 256 QAM) corresponding to the transport block 102. The output of the antenna mapping can be a set of symbols for each antenna port. The symbols of each antenna port can be subsequently applied to the OFDM modulator. For example, the symbols can be mapped to the basic OFDM time-frequency grid corresponding to the respective antenna port.

Figure 2:
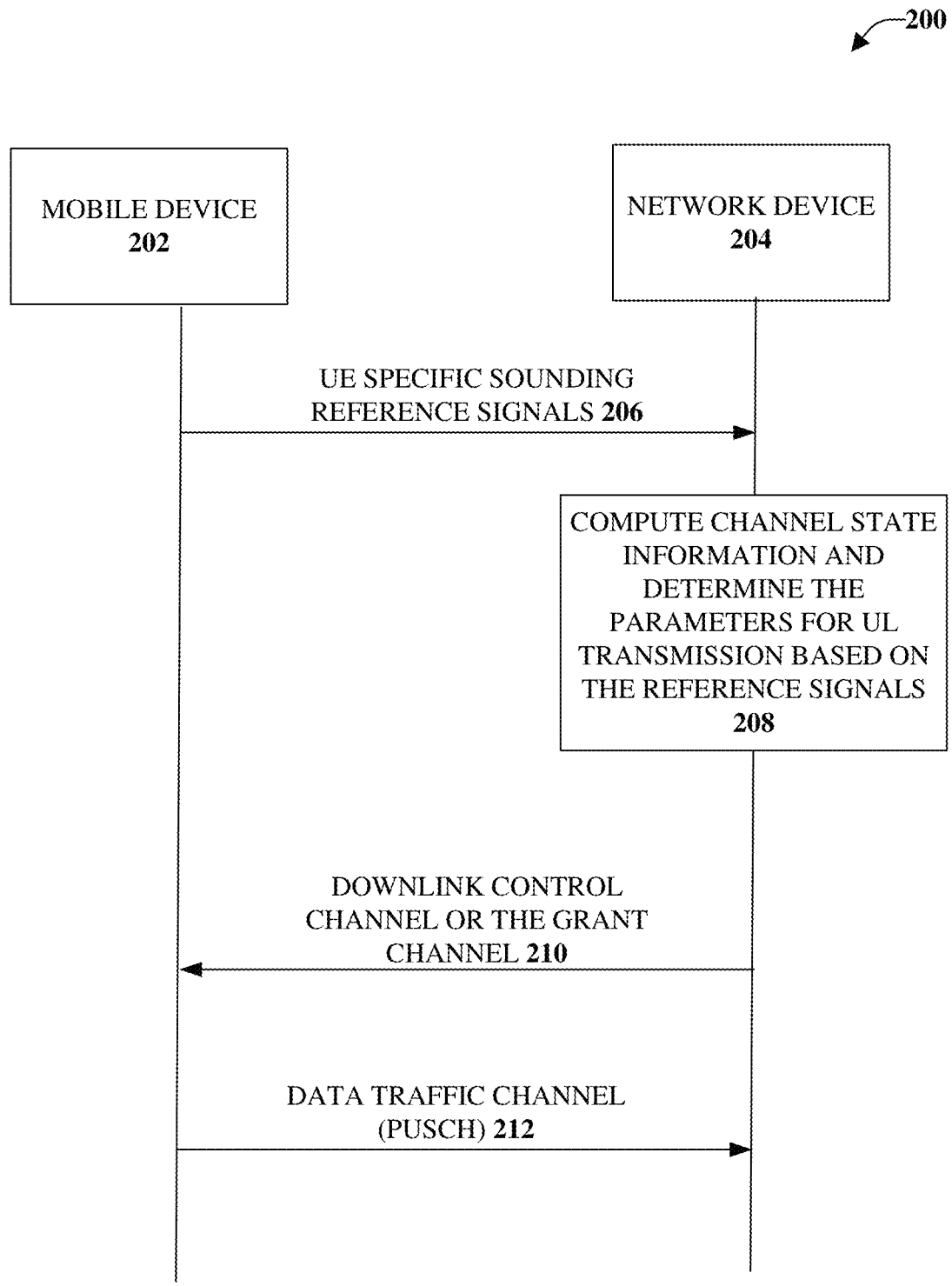
FIG. 2 illustrates an example, non-limiting message sequence flow chart for uplink data transfer in 5G systems in accordance with one or more embodiments described herein.

FIG. 2 illustrates an example, non-limiting message sequence flow chart 200 for uplink data transfer in 5G systems in accordance with one or more embodiments described herein. The non-limiting message sequence flow chart 200 can be utilized for new radio, as discussed herein. As illustrated, the non-limiting message sequence flow chart 200 represents the message sequence between a mobile device 202 and a network device 204.

The term "mobile device" can be interchangeable with (or include) a user equipment (UE) or other terminology. Mobile device (or user equipment) refers to any type of wireless device that communicates with a radio network node in a cellular or mobile communication system. Examples of UEs include, but are not limited to, a target device, a device to device (D2D) UE, a machine type UE or a UE capable of machine to machine (M2M) communication, a Personal Digital Assistant (PDA), a tablet, a mobile terminal, a smart phone, a laptop embedded equipment (LEE), a laptop mounted equipment (LME), a Universal Serial Bus (USB) dongle, and so on.

As used herein, the term "network device" can be interchangeable with (or include) a network, a network controller or any number of other network components. Further, as utilized herein, the non-limiting term radio network node, or simply network node (e.g., network device, network node device) is used herein to refer to any type of network node serving communications devices and/or connected to other network nodes, network elements, or another network node from which the communications devices can receive a radio signal. In cellular radio access networks (e.g., universal mobile telecommunications system (UMTS) networks), network devices can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network devices can also comprise multiple antennas for performing various transmission operations (e.g., Multiple Input Multiple Output (MIMO) operations). A network node can comprise a cabinet and other protected enclosures, an antenna mast, and actual antennas. Network devices can serve several cells, also called sectors, depending on the configuration and type of antenna. Examples of network nodes or radio network nodes (e.g., the network device 204) can include but are not limited to: NodeB devices, base station (BS) devices, access point (AP) devices, TRPs, and radio access network (RAN) devices. The network nodes can also include multi-standard radio (MSR) radio node devices, comprising: an MSR BS, a gNodeB, an eNode B, a network controller, a radio network controller (RNC), a base station controller (BSC), a relay, a donor node controlling relay, a base transceiver station (BTS), an access point (AP), a transmission point, a transmission node, a Remote Radio Unit (RRU), a Remote Radio Head (RRH), nodes in distributed antenna system (DAS), and the like.

The mobile device 202 can transmit sounding reference signals, at 206, that are specific to the mobile device (e.g., UE specific). From the sounding reference signals, the network device 204 can compute the channel estimates and can also compute the parameters needed for channel state information (CSI) determination, at 208. The determination performed by the network device 204 (e.g., at 208) based on the received reference signals can also comprise, for example, determining the channel quality indicator (CQI) and/or modulation and coding scheme (MCS), Transmit Precoding Matrix Index (TPMI), Transmit Rank Information (TRI), power, Physical Resource Blocks (PRBs), and so on.

Upon or after the network device 204 determines the parameters needed for scheduling uplink data, the network device 204 can inform the mobile device 202 of these parameters through a grant channel, also referred to as downlink control channel information (PDCCH), at 210. Upon or after the mobile device 202 receives the grant information, the mobile device 202 can transmit the uplink data using the Physical Uplink Shared Channel (PUSCH), at 212.

Uplink reference signals are predefined signals occupying specific resource elements within the uplink time-frequency grid. There can be at least two types of uplink reference signals that can be transmitted in different ways and used for different purposes by the network device 204, namely, sounding reference signals (SRS) and demodulation reference signals (DM-RS).

Sounding reference signals are specifically intended to be used by the network device 204 to acquire channel-state information (CSI) and beam specific information. In 5G systems, the sounding reference signals can be mobile device 202 specific and, therefore, can have a significantly lower time/frequency density.

Demodulation reference signals are specifically intended to be used by the network device 204 for channel estimation for data channel between the network device 204 and the mobile device 202. The label "UE-specific" relates to the fact that each demodulation reference signal is intended for channel estimation by the network device 204 from a specific mobile device 202. That specific reference signal is then only transmitted within the resource blocks assigned for data traffic channel transmission to that terminal (e.g., mobile device 202). Since the data is precoded, the DM-RS is also precoded with the same precoding used to precode the data.

Since the bandwidth of 5G systems is very large compared to other communication technologies, large variations in the channel can be expected for 5G systems. With large variations in the channel experienced at the mobile device, the probability of passing the packet can be low as the signal to noise ratio experienced by the mobile device can be averaged out with large variations of the channel. Therefore, the disclosed aspects provide solutions to improve the performance of uplink data transmission with large bandwidths.

As discussed herein, the disclosed aspects can improve the uplink data channel performance for all scenarios. The various aspects comprise embodiments which can be implemented in the network device (transmitter) and/or in the mobile device (receiver).

From the network device perspective, the network device can identify the channel from the mobile device and decide whether to choose frequency hopping or not (e.g., no frequency hopping) based on the channel conditions. For example, the network device can obtain information about the channel coefficients between the network and the mobile device. Optionally, the network device can determine the Doppler metric and the signal to noise ratio for the channel used for the mobile device. The recommendation can be communicated to the mobile device.

From the perspective of the mobile device, the mobile device can transmit data to the network device. The mobile device can receive the recommendation from the network device and can determine the transmission scheme based on the network device recommendation. Next, the mobile device can apply the recommended transmission scheme for uplink data transmission It is noted that the various aspects described herein can be applicable to single carrier as well as to multicarrier (MC) or carrier aggregation (CA) operation of the mobile device. The term carrier aggregation (CA) is also referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech is simultaneously scheduled).

For example purposes, the various aspects are discussed with respect to four transmit antennas. However, the various aspects can be applied with more or fewer antennas. For example, the various aspects can be applied with Ntx systems with rank equal to Ntx, where Ntx can be 2, 4, 8, 16, and so on. In addition, an uplink waveform can be either CP-OFDM (cyclic prefix based OFDM) or DFT-s-OFDM (also referred to as transform precoded). The network device can configure a particular mobile device with one or more waveforms to be used based on higher layer signaling or a physical layer signaling. The various aspects can be applicable to both waveforms.

Figure 3:
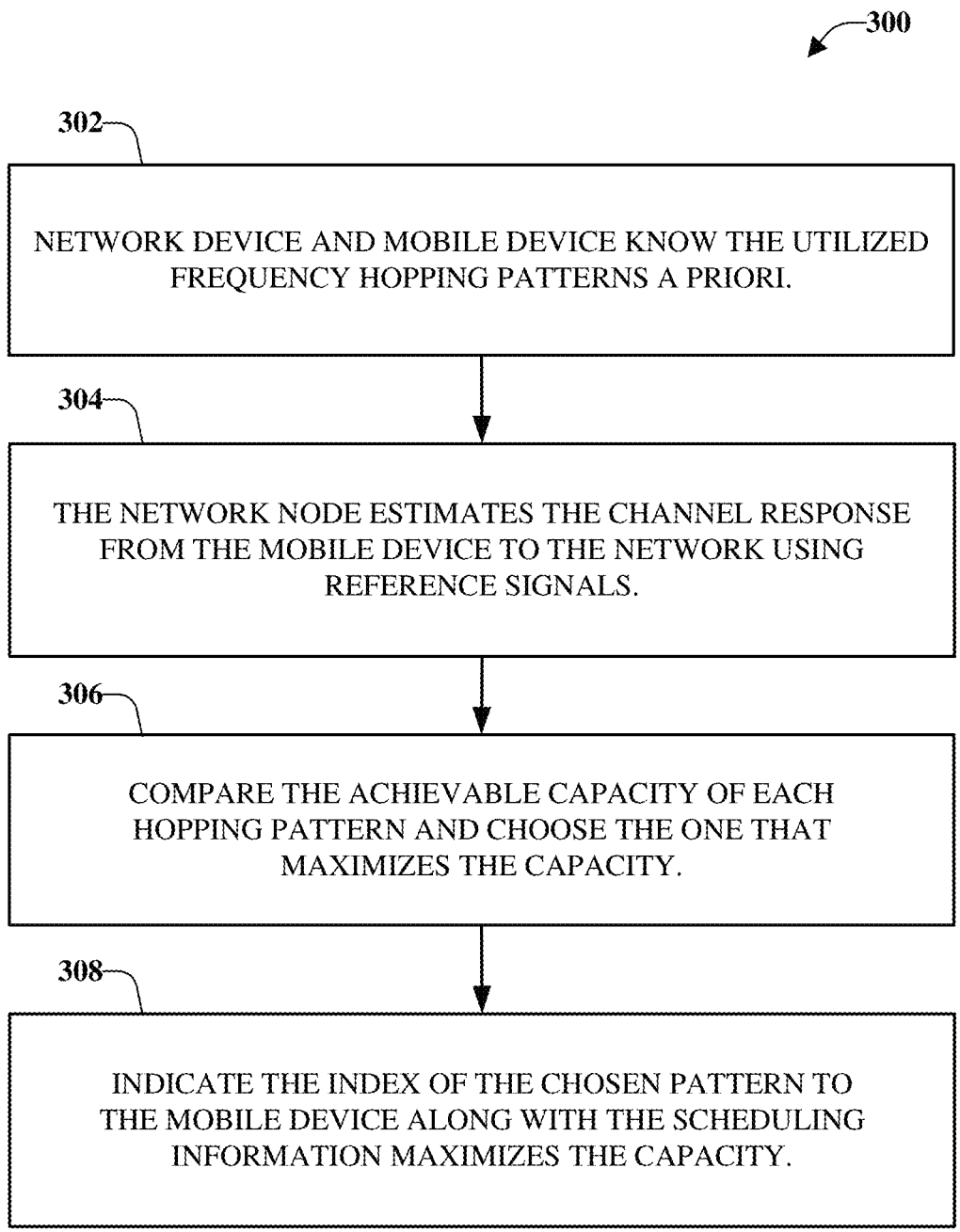
FIG. 3 illustrates an example, non-limiting method for improving the uplink performance in a wireless communications system in accordance with one or more embodiments described herein.

FIG. 3 illustrates an example, non-limiting method 300 for improving the uplink performance in a wireless communications system in accordance with one or more embodiments described herein. Repetitive description of like elements employed in other embodiments described herein is omitted for sake of brevity. At 302, the network device (e.g., the network device 204) and the mobile device (e.g., the mobile device 202) know, a priori the frequency hopping patterns that can be utilized within the communication network. The frequency hopping patterns can include a pattern that does not include frequency hopping (e.g., no frequency hopping pattern).

Figure 4:
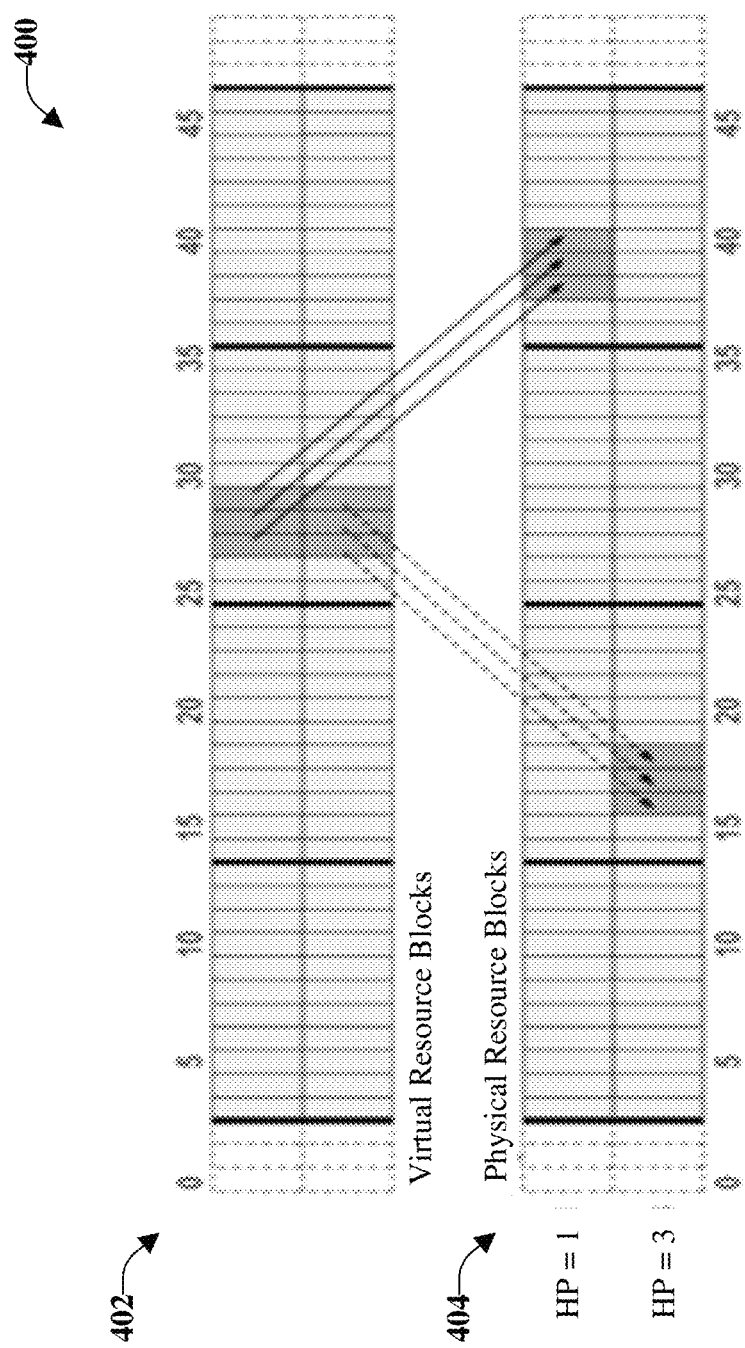
FIG. 4 illustrates an example, non-limiting frequency hopping pattern from virtual resource blocks to physical resource blocks mapping in accordance with one or more embodiments described herein.

FIG. 4 illustrates an example, non-limiting frequency hopping pattern from virtual resource blocks 402 to physical resource blocks 404 mapping in accordance with one or more embodiments described herein. As illustrated, with frequency hopping patterns the number of resource elements can be distributed over the entire bandwidth. With this distribution, the mobile device can achieve diversity gains. Note that the network and mobile device should be configured a priori with the frequency hopping patterns. For example, three frequency hopping patterns can be utilized, as illustrated in Table 1 below (although another number of frequency hopping patterns can be utilized with the disclosed aspects). Table 1 also includes a pattern that has no hopping as one index for the frequency hopping.

TABLE 1

| Hopping Index | Hopping pattern |
|---|---|
| 1 | H0 (means no hopping) |
| 2 | H1 (hopping pattern 1) |
| 3 | H2 (hopping pattern 2) |
| 4 | H3 (hopping pattern 3) |

With continuing reference to FIG. 3, the network device can estimate the channel response from the mobile device to the network device using the reference signals. The network device can determine which pattern provides the best capacity/mutual information from Table 1 by estimating the channel from the mobile device, at 304. For example, the capacity can be estimated if the network device knows the signal to noise ratios over the resource elements. Thus, at 306, the network device can compare the achievable capacity of each frequency hopping pattern and choose the frequency hopping pattern that maximizes the capacity. Upon or after the network device chooses the best pattern, the chosen frequency hopping pattern can be communicated to the mobile device, at 308. For example, the network node can indicate the pattern index via uplink grant channel (also referred to as downlink control information (DCI)). In another embodiment, the network device can communicate the information via Radio Resource Control (RRC) signaling.

Figure 5:
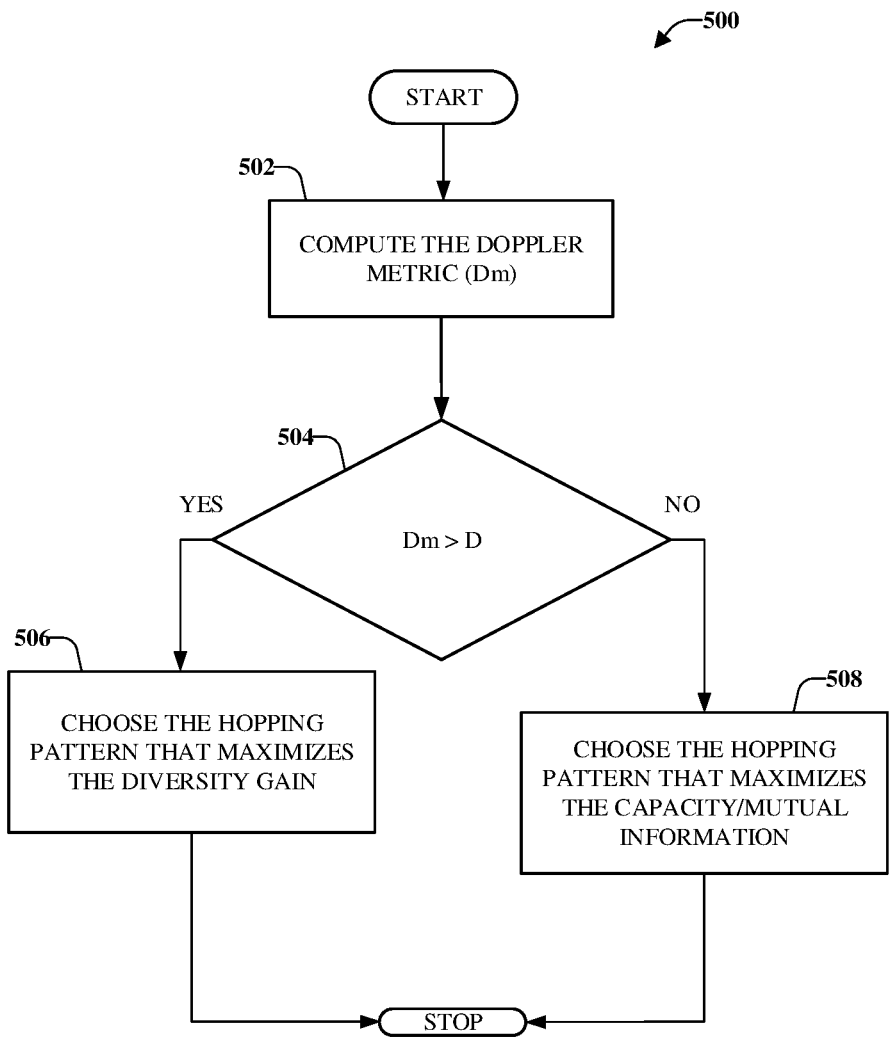
FIG. 5 illustrates an example, non-limiting method for using a Doppler metric as a decision criterion in accordance with one or more embodiments described herein.

FIG. 5 illustrates an example, non-limiting method 500 for using a Doppler metric as a decision criterion in accordance with one or more embodiments described herein. In this alternative or additional embodiment, if the network device detects that the mobile device is moving with a high Doppler, the network device can choose the hopping pattern that is more diverse as with high Doppler, the estimated channel might not be constant at the time of estimation and at the time of transmission. Thus, if the network detects the mobile device is moving with a high Doppler, the network device can choose the hopping pattern with the maximum frequency difference between the highest and lowest frequencies.

In further detail, at 502, the network device can compute the Doppler Metric (Dm) of the mobile device. At 504, the network device can determine whether the mobile device is moving a high speed (e.g., High Doppler) or at a low speed (e.g., low Doppler). For example, the determination at 504 can be whether the speed of the device (e.g., the measured Doppler Metric (Dm)) is above (or at) a defined threshold or a defined Doppler value (Dm>D). If the determination is that the speed of the device satisfies the defined threshold (is at or more than) the defined threshold ("YES"), at 506, the network device can choose the frequency hopping pattern that maximizes the diversity gain. If the determination is that the speed of the mobile device is not at or more than the defined threshold (e.g., is not at or above the defined threshold), at 508, the network device can choose the frequency hopping pattern that maximizes the capacity/mutual information.

According to some implementations, the network node can determine the speed of the mobile device using a direct speed measurement. For example, the network device can compute the direct speed of the mobile device by positioning and/or GPS at multiple intervals. In these implementations, the Dm can be taken as an average of the individual speed measurement.

In some implementations, the network node can determine the speed of the mobile device using a rate of change of uplink channel estimates. In these implementations, the network device can estimate the uplink channel. The rate of change of the uplink channel can provide a measure of the Doppler metric.

In other implementations, the network node can determine the speed of the mobile device using a rate of change of downlink channel quality information. For example, CQI is the channel quality information reported by the UE at any given time interval. Let $\Delta CQI$ represent the rate of change of CQI over K. Then, the Doppler metric can be computed as:

$$Dm = \Delta CQI/\Delta T$$

For the following example hopping patterns, it is noted that the bandwidth part (BWP) is the component carrier bandwidth or a portion of the component carrier known to the mobile device and the network. By way of example and not limitation, the starting position of the first hop is $RB_{start}$ then the RB during in each hop is given by:

$$RB_{start} = \begin{cases} RB_{start} & \text{First hop} \\ (RB_{start} + RB_{offset}) \bmod N_{BWP}^{size} & \text{Second hop} \end{cases},$$

where $RB_{start}$ is the starting resource within the UL BWP and $RB_{offset}$ is the frequency offset in RBs between the two frequency hops. This offset is signaled to the mobile device using downlink control channel as part of grant information.

Figure 6:
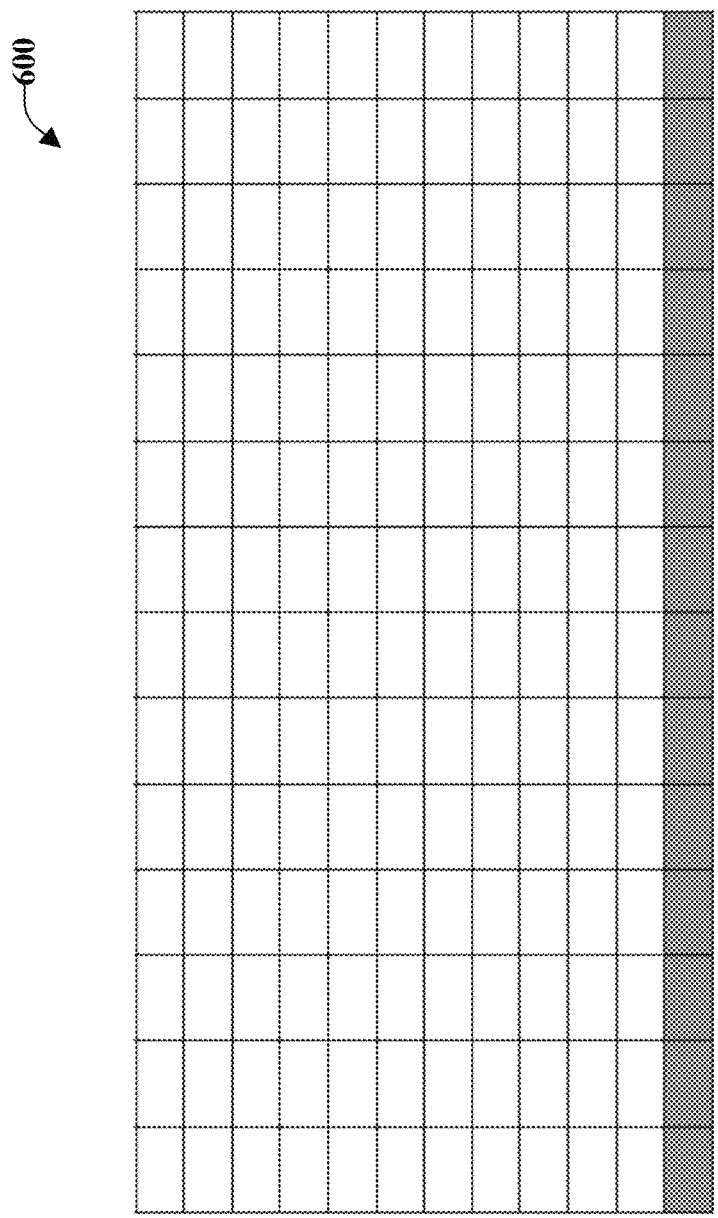
FIG. 6 illustrates an example, non-limiting representation of a time-frequency pattern with no hopping in accordance with one or more embodiments described herein.
Figure 7:
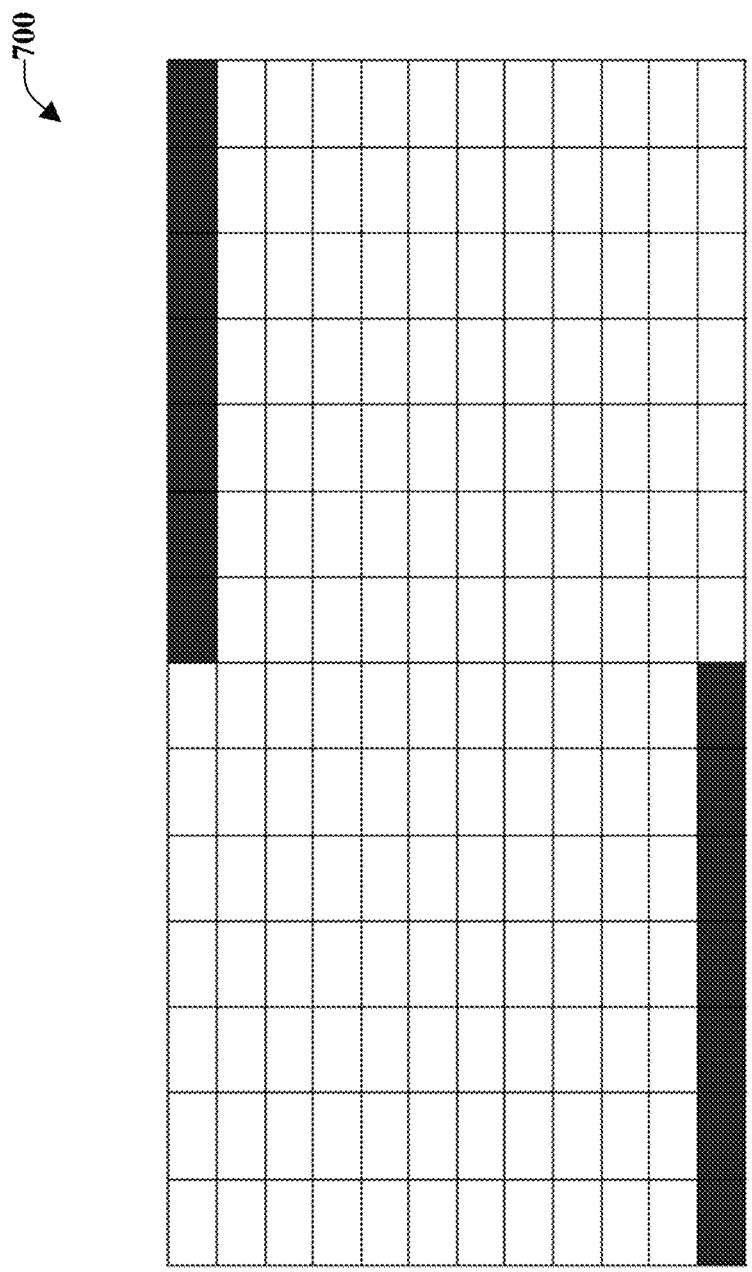
FIG. 7 illustrates an example, non-limiting representation of a first hopping pattern in accordance with one or more embodiments described herein.
Figure 8:
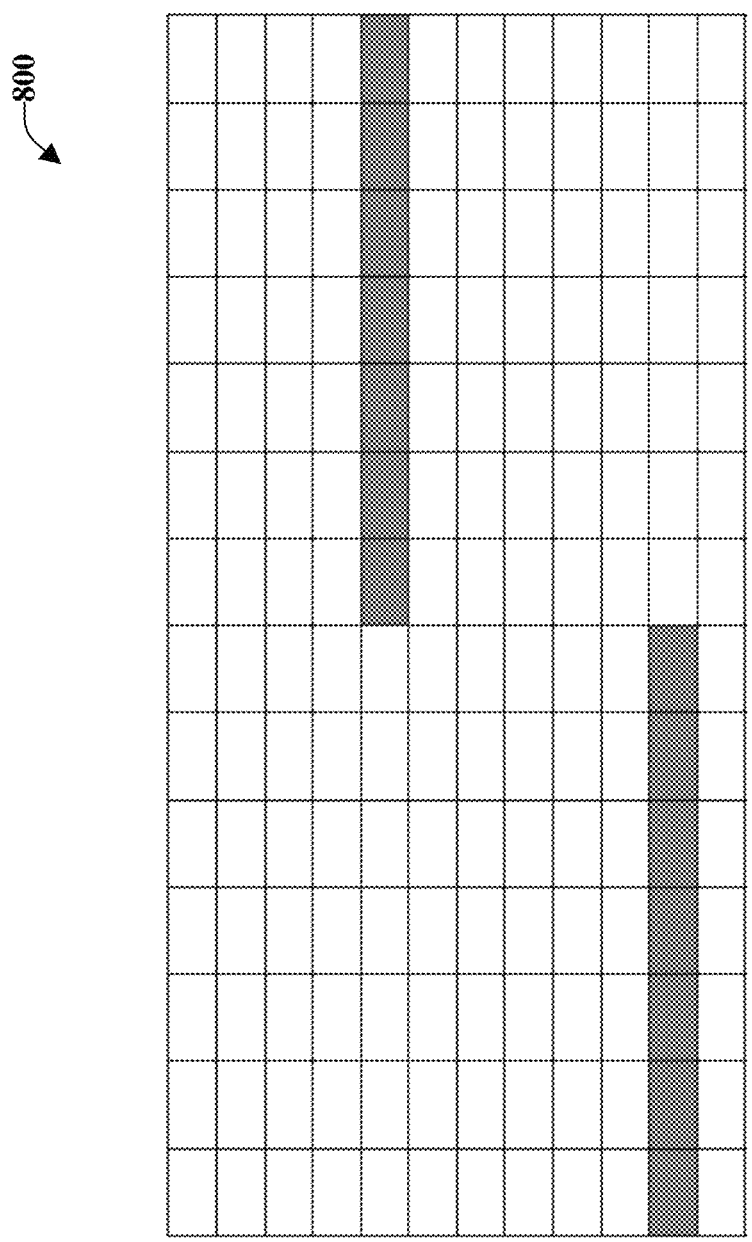
FIG. 8 illustrates an example, non-limiting representation of a second hopping pattern in accordance with one or more embodiments described herein.

To provide further context for the disclosed aspects, FIG. 6-8 illustrate example hopping patterns. It is noted that the hopping pattern examples of FIGS. 6-8 (as well as other examples provided herein) are for purposes of explaining the various aspects, which are not limited to the example hopping patterns.

FIG. 6 illustrates an example, non-limiting representation 600 of a time-frequency pattern with no hopping in accordance with one or more embodiments described herein. The example hopping pattern of FIG. 6 can correspond to hopping pattern H0 (no hopping) of Table 1 above. It is noted that in this frequency hopping pattern, there is minimum frequency difference between the highest and lowest frequencies.

FIG. 7 illustrates an example, non-limiting representation 700 of a first hopping pattern in accordance with one or more embodiments described herein. The example hopping pattern of FIG. 7 can correspond to hopping pattern H1 (hopping pattern 1) of Table 1 above. In this case, the $RB_{offset}$ is maximum.

Further, FIG. 8 illustrates an example, non-limiting representation 800 of a second hopping pattern in accordance with one or more embodiments described herein. The example hopping pattern of FIG. 8 can correspond to hopping pattern H2 (hopping pattern 2) of Table 1 above. In this case, a different value of $RB_{offset}$ is provided, as compared to the frequency hopping pattern (H1) of FIG. 7.

Figure 9:
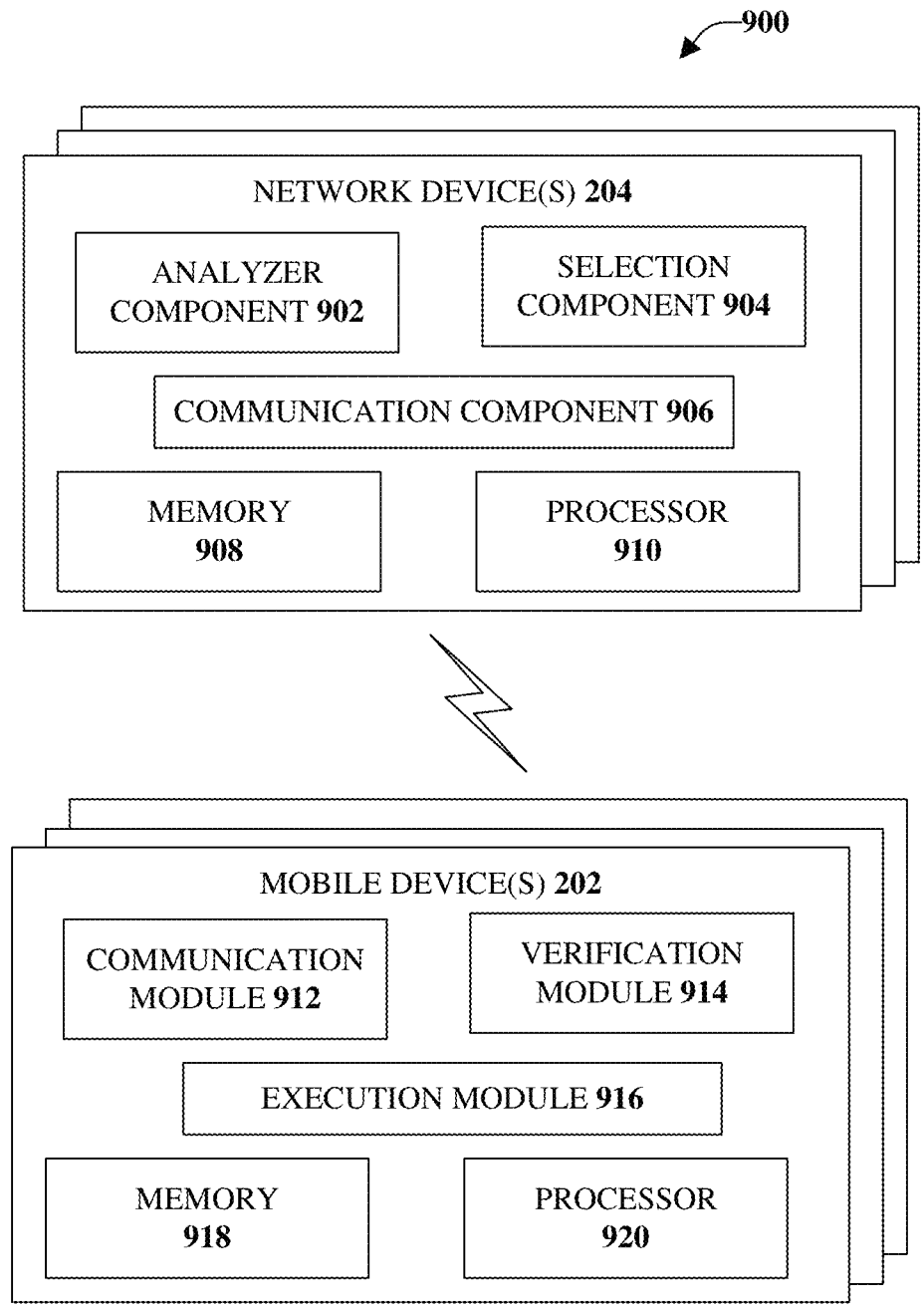
FIG. 9 illustrates an example, non-limiting communications system for facilitating improvements to the uplink performance of a communications network in accordance with one or more embodiments described herein.

FIG. 9 illustrates an example, non-limiting communications system 900 for facilitating improvements to the uplink performance of a communications network in accordance with one or more embodiments described herein. Repetitive description of like elements employed in other embodiments described herein is omitted for sake of brevity.

The communications system 900 can comprise one or more user equipment or mobile devices (illustrated as the mobile device 202) and one or more gNBs or network devices (illustrated as the network device 204). The network device 204 can be included in a group of network devices of a wireless network. It is noted that although only a single mobile device and a single network device are illustrated, the communications system 900 can comprise a multitude of mobile devices and/or a multitude of network devices.

The network device 204 can comprise an analyzer component 902, a selection component 904, a communication component 906, at least one memory 908, and at least one processor 910. Further, the mobile device 202 can comprise a communication module 912, a verification module 914, an execution module 916, at least one memory 918, and at least one processor 920.

The analyzer component 902 can compare respective metrics of a group of frequency hopping patterns based on a channel response received from the mobile device 202 via uplink reference signals. For example, the mobile device 202 can transmit, via the communication module 912, sounding reference signals to the network device 204. The uplink reference signals can occupy defined resource elements within an uplink time frequency grid and the analyzer component 902 can estimate the respective metrics based on a signal to noise ratio over the defined resource element. According to an implementation, capacity can be chosen for the metric. In another implementation, speed of the mobile device can be chosen for the metric.

The selection component 904 can select a frequency hopping pattern from the group of frequency hopping patterns based on a result of the comparing by the analyzer component 902. For example, the group of frequency hopping patterns compared by the analyzer component 902 (and selected by the selection component 904) can be included in a listing of frequency hopping patterns known to both the mobile device 202 and the network device 204. For example, prior to analyzing the frequency hopping patterns, the network device 204 can configure the mobile device 202 with the group of frequency hopping patterns via the communication component 906 and the communication module 912. According to some implementations, the group of frequency hopping patterns can include a subset of hopping patterns that are available. However, the group of frequency hopping patterns can be those hopping patterns expected to be utilized by the network device 204 and the mobile device 202.

Upon or after the selection by the selection component 904, the communication component 906 can indicate, to the mobile device 202, an index of the frequency hopping pattern with scheduling information to increase a data capacity of a communications network. In an example, the communication component 906 can indicate the index of the frequency hopping pattern selected via an uplink grant channel In another example, the communication component 906 can indicate the index of the frequency hopping pattern selected via radio resource control signaling. According to some implementations, the communication component 906 can indicate the index of the frequency hopping pattern selected with the scheduling information via a downlink control channel configured to operate according to a fifth-generation wireless communication network protocol.

In some implementations, the frequency hopping pattern can change during data transmission. For example, the comparison, selection, and indication of the frequency hopping pattern can be performed for the one or more transmission time intervals of the data transmission. Thus, the frequency hopping pattern can change from one transmission time interval to another transmission time interval.

The respective one or more memories 908, 918 can be operatively coupled to the respective one or more processors 910, 920. The respective one or more memories 908, 918 can store protocols associated with dynamically selecting frequency hopping patterns from a group of frequency hopping patterns to improve the uplink performance of a communications network as discussed herein. Further, the respective one or more memories 908, 918 can facilitate action to control communication between the network device 204 and the mobile device 202, such that the communications system 900 can employ stored protocols and/or algorithms to achieve improved communications in a wireless network as described herein.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The respective processors 910, 920 can facilitate improvements to the uplink performance in a communication network. The processors 910, 920 can be processors dedicated to analyzing and/or generating information received, processors that control one or more components of the communications system 900, and/or processors that both analyze and generate information received and control one or more components of the communications system 900.

Figure 10:
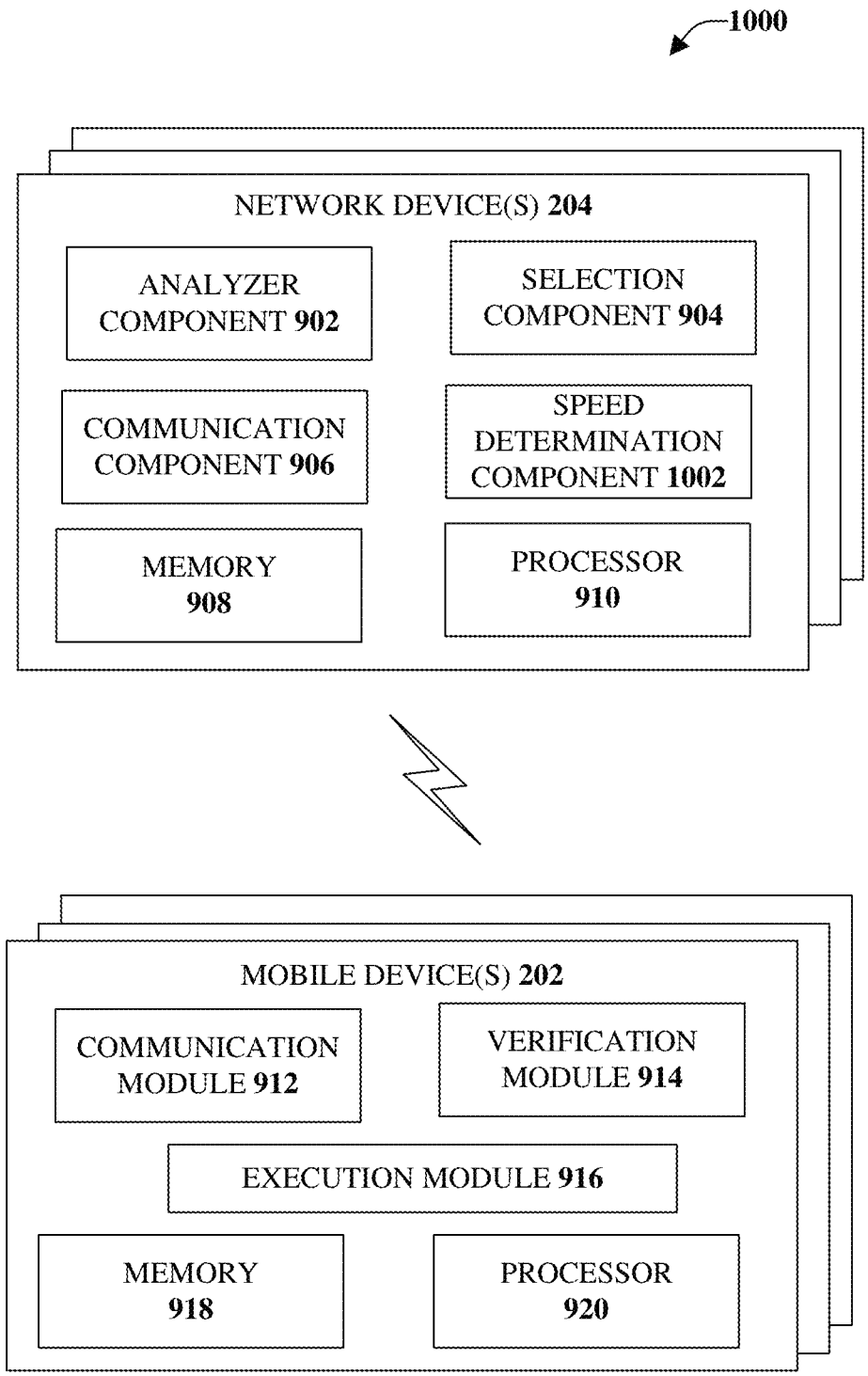
FIG. 10 illustrates an example, non-limiting, communications system for utilizing a speed of a mobile device to select frequency hopping patterns in accordance with one or more embodiments described herein.

FIG. 10 illustrates an example, non-limiting, communications system 1000 for utilizing a speed of a mobile device to select frequency hopping patterns in accordance with one or more embodiments described herein. Repetitive description of like elements employed in other embodiments described herein is omitted for sake of brevity.

As illustrated, the network device 204 can comprise a speed determination component 1002 that can determine a Doppler metric of the mobile device. For example, the Doppler metric can be determined by the speed determination component 1002 based on a direct speed measurement, a rate of change of uplink channel estimates, and/or a rate of change of downlink channel quality information.

Based on a first determination that the Doppler metric does satisfy a defined threshold, the selection component 904 can choose a first frequency hopping pattern of the group of frequency hopping patterns that increases a diversity gain of the communications network relative to a current diversity gain.

Alternatively, based on a second determination that the Doppler metric does not satisfy the defined threshold, the selection component 904 can choose a second frequency hopping pattern of the group of frequency hopping patterns that increases channel capacity information relative to current channel capacity information. In an implementation, the selection component 904 can select the second frequency hopping pattern based on a determination that the second frequency hopping pattern comprises a maximum frequency difference between a highest frequency and a lowest frequency in comparison to other frequency hopping patterns in the set of frequency hopping patterns.

Figure 11:
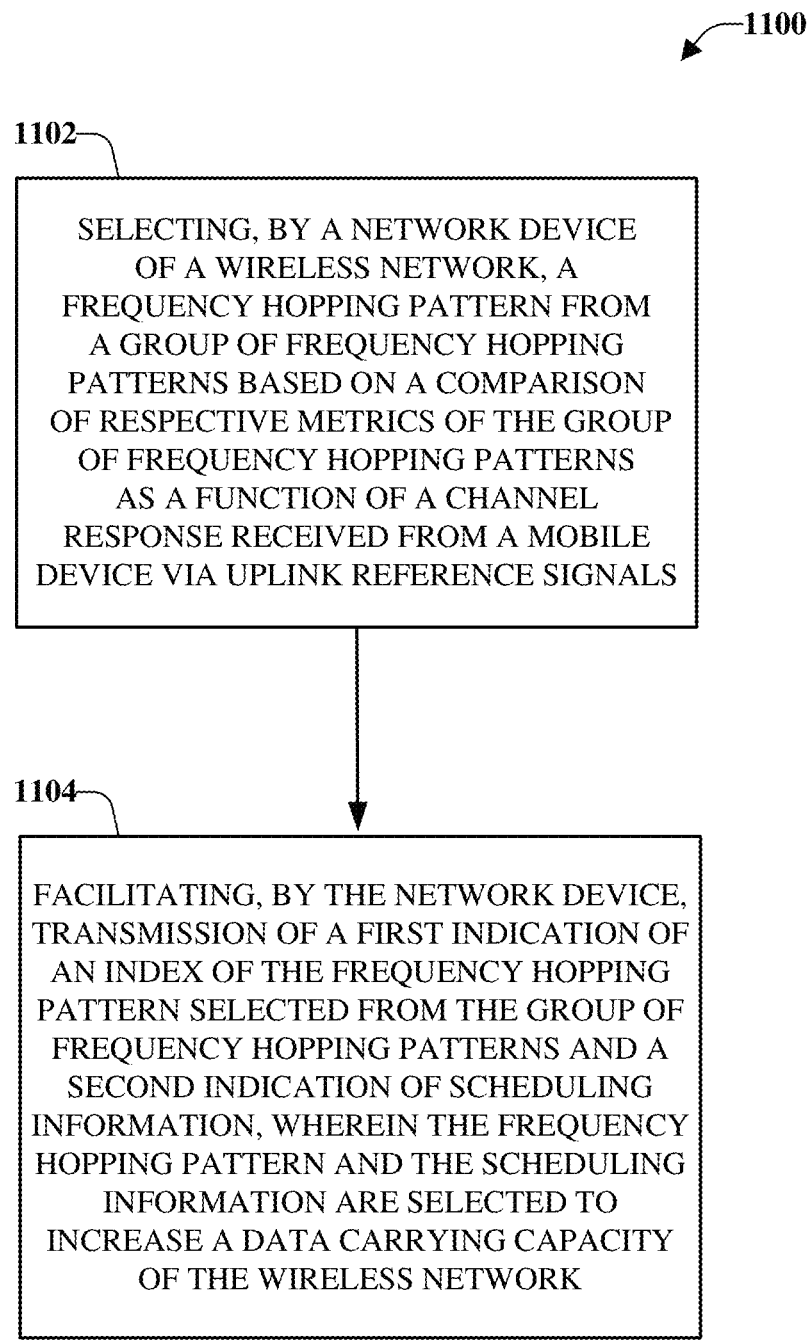
FIG. 11 illustrates an example, non-limiting method for selecting frequency hopping patterns in accordance with one or more embodiments described herein.

FIG. 11 illustrates an example, non-limiting method 1100 for selecting frequency hopping patterns in accordance with one or more embodiments described herein. The method 1100 can be implemented by a network device of a wireless network, the network device comprising a processor. Alternatively, or additionally, a machine-readable storage medium can comprise executable instructions that, when executed by a processor, facilitate performance of operations for the method 1100.

The method 1100 starts at 1102 with selecting, by a network device of a wireless network, a frequency hopping pattern from a group of frequency hopping patterns based on a comparison of respective metrics of the group of frequency hopping patterns as a function of a channel response received from a mobile device via uplink reference signals.

At 1104, the network device can facilitate transmission of a first indication of an index of the frequency hopping pattern selected from the group of frequency hopping patterns and a second indication of scheduling information. The frequency hopping pattern and the scheduling information can be selected to increase a data carrying capacity of the wireless network.

According to an implementation, facilitating the transmission can comprise facilitating the transmission via a downlink control information channel According to another implementation, facilitating the transmission can comprise facilitating the transmission via radio resource control signaling.

Selecting the frequency hopping pattern can be performed during different transmission time intervals according to some implementations. Further to these implementations, facilitating the transmission can comprise facilitating the transmission based on a change to the frequency hopping pattern selected between the different transmission time intervals.

According to some implementations, prior to selecting the frequency hopping pattern, the network device can configure the mobile device with information related to the group of frequency hopping patterns.

Figure 12:
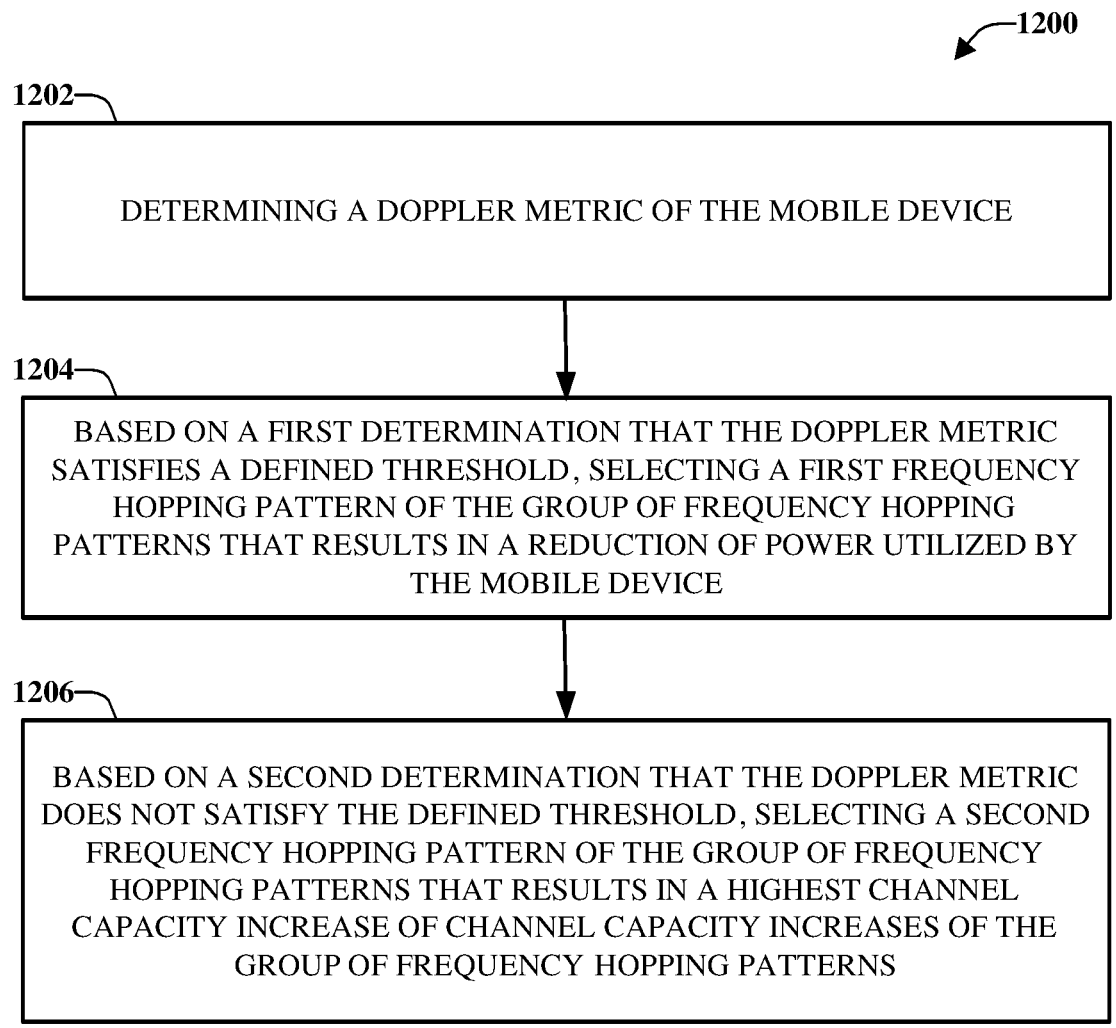
FIG. 12 illustrates an example, non-limiting, method for selecting hopping patterns based on a Doppler metric in accordance with one or more embodiments described herein.

FIG. 12 illustrates an example, non-limiting, method 1200 for selecting hopping patterns based on a Doppler metric in accordance with one or more embodiments described herein. The method 1200 can be implemented by a network device of a wireless network, the network device comprising a processor. Alternatively, or additionally, a machine-readable storage medium can comprise executable instructions that, when executed by a processor, facilitate performance of operations for the method 1200.

At 1202, a Doppler metric of the mobile device can be determined. According to an example, the Doppler metric of the mobile device can be determined by a direct speed measurement. In another example, the Doppler metric of the mobile device can be determined by a rate of change of uplink channel estimates. In accordance with another example, the Doppler metric of the mobile device can be determined by a rate of change of downlink channel quality information.

Based on a first determination that the Doppler metric does satisfy a defined threshold, at 1204, a first frequency hopping pattern of the group of frequency hopping patterns that results in a reduction of power utilized by the mobile device can be selected.

Alternatively, based on a second determination that the Doppler metric satisfies does not the defined threshold, at 1206, a second frequency hopping pattern of the group of frequency hopping patterns that results in a highest channel capacity increase of channel capacity increases of the group of frequency hopping patterns can be selected.

Further, selecting the second frequency hopping pattern can comprise selecting the frequency hopping pattern based on a determination that the frequency hopping pattern comprises a maximum frequency difference between a highest frequency and a lowest frequency as compared to other frequency hopping patterns in the set of frequency hopping patterns.

Described herein are systems, methods, articles of manufacture, and other embodiments or implementations that can facilitate improvements to the uplink performance for a 5G network. Facilitating improvements to the uplink performance in a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 13:
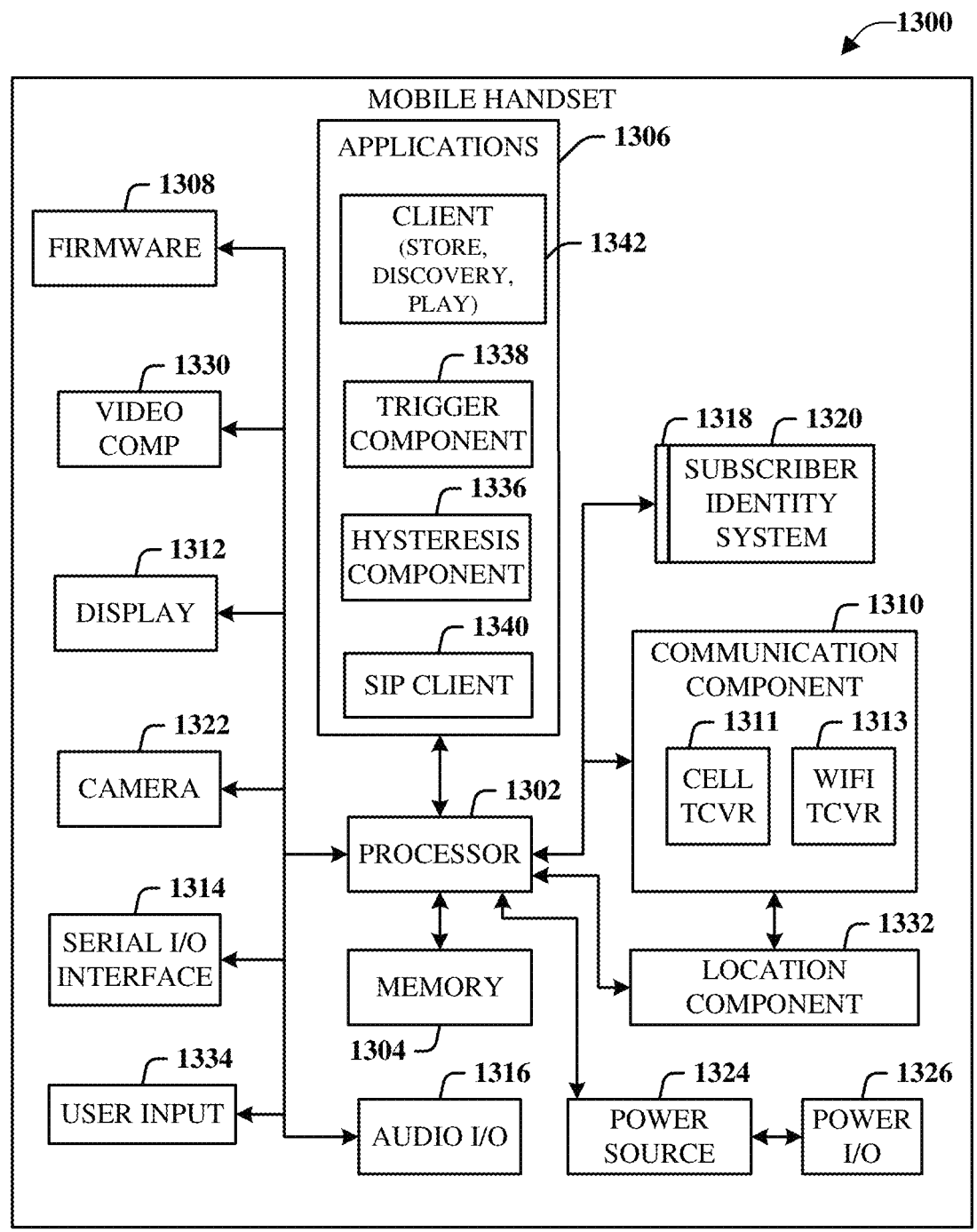
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1410 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
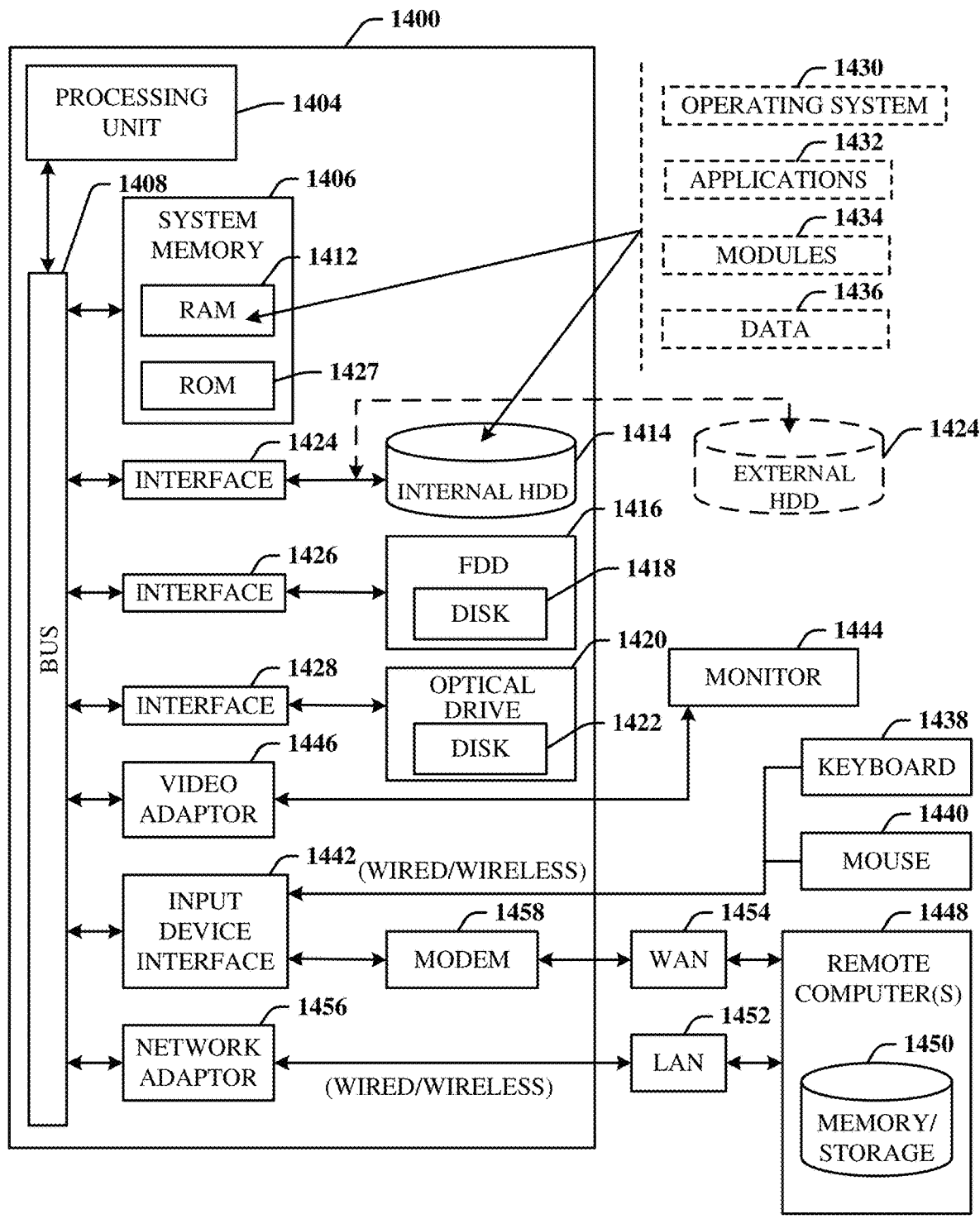
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operation, comprising;
      comparing respective metrics of a group of frequency hopping patterns based on channel response received from a mobile device via uplink reference signals, wherein the comparing comprises estimating the respective metrics based on respective capacities of the mobile device, wherein the respective capacities are determined based on respective signal to noise ratios experienced by the mobile device over defined resource elements within an uplink time frequency grid, and wherein the group of frequency hopping patterns comprises a non-frequency hopping pattern that comprises no frequency hopping and at least two other frequency hopping patterns;
      selecting the non-frequency hopping pattern or a frequency hopping pattern of the at least two other frequency hopping patterns from the group of frequency hopping patterns based on a result of the comparing; and indicating, to the mobile device, an index of the frequency hopping pattern with scheduling information of a communications network.

2. The system of claim 1, wherein the indicating the index of the frequency hopping pattern selected comprises transmitting the index to the mobile device via an uplink grant channel.

3. The system of claim 1, wherein the indicating the index of the frequency hopping pattern selected comprises sending the index to the mobile device using radio resource control signaling.

4. The system of claim 1, wherein the indicating the index comprises indicating the index during respective transmission time intervals of data transmission.

5. The system of claim 1, wherein the selecting the frequency hopping pattern comprises selecting the non-frequency hopping pattern that comprises no frequency hopping.

6. The system of claim 1, wherein the uplink reference signals occupy the defined resource elements within the uplink time frequency grid.

7. The system of claim 1, wherein the operations further comprise configuring the mobile device with the group of frequency hopping patterns using radio resource control signaling.

8. The system of claim 1, wherein the comparing the respective metrics comprises determining a Doppler metric of the mobile device, and wherein the selecting the frequency hopping pattern comprises:
based on a first determination that the Doppler metric satisfies a defined threshold, selecting a first frequency hopping pattern of the at least two other frequency hopping patterns of the group of frequency hopping patterns that increases a diversity gain of the communications network relative to a current diversity gain; and
based on a second determination that the Doppler metric does not satisfy the defined threshold, selecting a second frequency hopping pattern of the at least two other frequency hopping patterns of the group of frequency hopping patterns that increases channel capacity information relative to current channel capacity information.

9. The system of claim 8, wherein the selecting the second frequency hopping pattern comprises selecting the second frequency hopping pattern based on a determination that the second frequency hopping pattern comprises a maximum frequency difference between a highest frequency and a lowest frequency in comparison to other ones of the at least two other frequency hopping patterns in the group of frequency hopping patterns.

10. The system of claim 1, wherein the indicating the index of the frequency hopping pattern with the scheduling information comprises indicating via a downlink control channel configured to operate according to a fifth-generation wireless communication network protocol.

11. A method, comprising:
determining, by a network device of a wireless network, respective capacities of a mobile device based on respective signal to noise ratios of defined resource elements within an uplink time frequency grid;
selecting, by the network device, a frequency hopping pattern from a group of frequency hopping patterns based on a comparison of respective metrics of the group of frequency hopping patterns as a function of a channel response received from the mobile device via uplink reference signals and based on a determination that the frequency hopping pattern increases the respective capacities of the mobile device as compared to other frequency hopping patterns of the group of frequency hopping patterns, wherein the group of frequency hopping patterns comprises a subset of available hopping patterns, and wherein the group of frequency hopping patterns are known a priori by the network device and the mobile device; and
facilitating, by the network device, transmission of a first indication of an index of the frequency hopping pattern selected from the group of frequency hopping patterns and a second indication of scheduling information, wherein the frequency hopping pattern and the scheduling information are selected to increase a data carrying capacity of the wireless network.

12. The method of claim 11, wherein the facilitating the transmission comprises facilitating the transmission via a downlink control information channel.

13. The method of claim 11, wherein the facilitating the transmission comprises facilitating the transmission via radio resource control signaling.

14. The method of claim 11, wherein the selecting the frequency hopping pattern is performed during different transmission time intervals, and wherein the facilitating the transmission comprises facilitating the transmission based on a change to the frequency hopping pattern selected between the different transmission time intervals.

15. The method of claim 11, further comprising:
prior to the selecting the frequency hopping pattern, configuring, by the network device, the mobile device with information related to the group of frequency hopping patterns.

16. The method of claim 11, further comprising:
determining a Doppler metric of the mobile device, and wherein the selecting the frequency hopping pattern comprises:
based on a first determination that the Doppler metric satisfies a defined threshold, selecting a first frequency hopping pattern of the group of frequency hopping patterns that results in a reduction of power utilized by the mobile device; and
based on a second determination that the Doppler metric does not satisfy the defined threshold, selecting a second frequency hopping pattern of the group of frequency hopping patterns that results in a highest channel capacity increase of channel capacity increases of the group of frequency hopping patterns.

17. The method of claim 16, wherein the selecting the second frequency hopping pattern comprises selecting the frequency hopping pattern based on a third determination that the frequency hopping pattern comprises a maximum frequency difference between a highest frequency and a lowest frequency as compared to other frequency hopping patterns in the group of frequency hopping patterns.

18. A method, comprising:
receiving, by a mobile device comprising a processor, and from a network device, a recommended frequency hopping pattern, wherein the recommended frequency hopping pattern facilitates a level of capacity for the mobile device being above a threshold level according to signal to noise ratios determined for defined resource elements within an uplink time frequency grid, wherein the recommended frequency hopping pattern is selected from a group of frequency hopping patterns comprising a first frequency hopping pattern, a second frequency hopping pattern, and a third frequency hopping pattern that comprises no frequency hopping;

determining, by the mobile device, a transmission scheme based on the recommended frequency hopping pattern; and applying, by the mobile device, the transmission scheme for an uplink data transmission.

19. The method of claim 18, wherein the transmission scheme is determined based on a hopping index and scheduling information received at the mobile device with the recommended frequency hopping pattern.

20. The method of claim 18, wherein the recommended frequency hopping pattern is based, in part, on a Doppler metric of the mobile device, and wherein the method further comprises:

receiving, at the mobile device, a first recommendation of the first frequency hopping pattern from the group of frequency hopping patterns based on the Doppler metric satisfying a defined threshold, wherein the first frequency hopping pattern increases a diversity gain of a communications network; and receiving, at the mobile device, a second recommendation of the second frequency hopping pattern from the group of frequency hopping patterns based on the Doppler metric not satisfying the defined threshold, wherein the second frequency hopping pattern increases capacity information and mutual information of a channel.

* * * * *